(12) United States Patent
Burton et al.

(10) Patent No.: US 11,158,867 B2
(45) Date of Patent: Oct. 26, 2021

(54) CATALYST LAYER

(71) Applicant: JOHNSON MATTHEY FUEL CELLS LIMITED, London (GB)

(72) Inventors: Sarah Louise Burton, Oxon (GB); Angus John Dickinson, Swindon (GB); Julie O'Sullivan, Didcot (GB)

(73) Assignee: Johnson Matthey Fuel Cells Limited, London (GB)

(*) Notice: Subject to any disclaimer, the term of this patent is extended or adjusted under 35 U.S.C. 154(b) by 12 days.

(21) Appl. No.: 15/105,375

(22) PCT Filed: Dec. 12, 2014

(86) PCT No.: PCT/GB2014/053682
§ 371 (c)(1),
(2) Date: Jun. 16, 2016

(87) PCT Pub. No.: WO2015/092371
PCT Pub. Date: Jun. 25, 2015

(65) Prior Publication Data
US 2017/0033369 A1      Feb. 2, 2017

(30) Foreign Application Priority Data

Dec. 19, 2013  (GB) ..................... 1322494

(51) Int. Cl.
H01M 4/92 (2006.01)
H01M 4/88 (2006.01)
(Continued)

(52) U.S. Cl.
CPC .............. *H01M 4/928* (2013.01); *C25B 9/23* (2021.01); *C25B 11/091* (2021.01);
(Continued)

(58) Field of Classification Search
None
See application file for complete search history.

(56) References Cited

U.S. PATENT DOCUMENTS 3,252,839 A * 5/1966 Langer ................ C25B 11/0489
                                                    204/294
3,715,238 A * 2/1973 Mayell .................. H01M 4/921
                                                    502/101
(Continued)

FOREIGN PATENT DOCUMENTS

EP    2 475 034 A1    7/2012
GB    2 009 792 A    6/1979
(Continued)

OTHER PUBLICATIONS

International Search Report, dated Feb. 11, 2015, from corresponding PCT Application.
(Continued)

*Primary Examiner* — Zhongqing Wei
(74) *Attorney, Agent, or Firm* — BakerHostetler

(57) ABSTRACT

A catalyst layer including: (i) a platinum-containing electrocatalyst; (ii) an oxygen evolution reaction electrocatalyst; (iii) one or more carbonaceous materials selected from the group consisting of graphite, nanofibres, nanotubes, nanographene platelets and low surface area, heat-treated carbon blacks wherein the one or more carbonaceous materials do not support the platinum-containing electrocatalyst; and (iv) a proton-conducting polymer and its use in an electrochemical device are disclosed.

17 Claims, 2 Drawing Sheets

(51) Int. Cl.
*H01M 4/96* (2006.01)
*C25B 9/23* (2021.01)
*C25B 11/091* (2021.01)
*C25B 11/095* (2021.01)
*H01M 8/1018* (2016.01)

(52) U.S. Cl.
CPC ......... *C25B 11/095* (2021.01); *H01M 4/8814* (2013.01); *H01M 4/8828* (2013.01); *H01M 4/96* (2013.01); *H01M 2008/1095* (2013.01)

(56) References Cited

U.S. PATENT DOCUMENTS

| | | | |
|---|---|---|---|
| 6,309,535 B1* | 10/2001 | Williams | G01N 27/308 |
| | | | 204/294 |
| 6,309,772 B1* | 10/2001 | Zuber | H01M 4/8835 |
| | | | 429/483 |
| 8,216,541 B2* | 7/2012 | Jang | B82Y 30/00 |
| | | | 252/500 |
| 2003/0068544 A1 | 4/2003 | Cisar et al. | |
| 2004/0126644 A1 | 7/2004 | Bett et al. | |
| 2005/0063893 A1* | 3/2005 | Ayala | B82Y 30/00 |
| | | | 423/449.1 |
| 2009/0068541 A1 | 3/2009 | Yan et al. | |
| 2009/0130527 A1* | 5/2009 | McLean | H01M 4/8626 |
| | | | 429/513 |
| 2009/0186248 A1 | 7/2009 | Ye | |
| 2012/0214084 A1* | 8/2012 | Sharman | C25B 9/10 |
| | | | 429/482 |

FOREIGN PATENT DOCUMENTS

| | | |
|---|---|---|
| JP | S62-17193 A | 1/1987 |
| KR | 10-2011-0139080 A | 12/2011 |
| WO | 01/15247 A2 | 3/2001 |
| WO | 2006/062947 A2 | 6/2006 |
| WO | 2006/124959 A2 | 11/2006 |
| WO | 2011/021034 A1 | 2/2011 |
| WO | 2012/080726 A1 | 6/2012 |
| WO | 2012107738 A1 | 8/2012 |

OTHER PUBLICATIONS

United Kingdom Search Report, dated Jun. 19, 2014, from corresponding GB Application.

* cited by examiner

CATALYST LAYER

FIELD OF THE INVENTION

The present invention relates to a catalyst layer, which shows tolerance to high voltage situations, such as cell reversal and start-up shut-down incidences that occur in fuel cells. The invention also relates to electrodes, catalyst-coated membranes and membrane electrode assemblies comprising the catalyst layer.

BACKGROUND OF THE INVENTION

A fuel cell is an electrochemical cell comprising two electrodes separated by an electrolyte. A fuel, e.g. hydrogen, an alcohol such as methanol or ethanol, or formic acid, is supplied to the anode and an oxidant, e.g. oxygen or air, is supplied to the cathode. Electrochemical reactions occur at the electrodes, and the chemical energy of the fuel and the oxidant is converted to electrical energy and heat. Electrocatalysts are used to promote the electrochemical oxidation of the fuel at the anode and the electrochemical reduction of oxygen at the cathode.

Fuel cells are usually classified according to the nature of the electrolyte employed. Often the electrolyte is a solid polymeric membrane, in which the membrane is electronically insulating but ionically conducting. In the proton exchange membrane fuel cell (PEMFC) the membrane is proton conducting, and protons, produced at the anode, are transported across the membrane to the cathode, where they combine with oxygen to form water.

A principal component of the PEMFC is the membrane electrode assembly (MEA), which is essentially composed of five layers. The central layer is the polymer ion-conducting membrane. On either side of the ion-conducting membrane there is an electrocatalyst layer, containing an electrocatalyst designed for the specific electrolytic reaction. Finally, adjacent to each electrocatalyst layer there is a gas diffusion layer. The gas diffusion layer must allow the reactants to reach the electrocatalyst layer and must conduct the electric current that is generated by the electrochemical reactions. Therefore the gas diffusion layer must be porous and electrically conducting.

Electrocatalysts for fuel oxidation and oxygen reduction are typically based on platinum or platinum alloyed with one or more other metals. The platinum or platinum alloy catalyst can be in the form of unsupported nanoparticles (such as metal blacks or other unsupported particulate metal powders) or can be deposited as even higher surface area particles onto a conductive carbon substrate or other conductive material (a supported catalyst).

Conventionally, the MEA can be constructed by a number of methods outlined hereinafter:

(i) The electrocatalyst layer may be applied to the gas diffusion layer to form a gas diffusion electrode. A gas diffusion electrode is placed on each side of an ion-conducting membrane and laminated together to form the five-layer MEA;

(ii) The electrocatalyst layer may be applied to both faces of the ion-conducting membrane to form a catalyst coated ion-conducting membrane. Subsequently, a gas diffusion layer is applied to each face of the catalyst coated ion-conducting membrane.

(iii) An MEA can be formed from an ion-conducting membrane coated on one side with an electrocatalyst layer, a gas diffusion layer adjacent to that electrocatalyst layer, and a gas diffusion electrode on the other side of the ion-conducting membrane.

Typically tens or hundreds of MEAs are required to provide enough power for most applications, so multiple MEAs are assembled to make up a fuel cell stack. Field flow plates are used to separate the MEAs. The plates perform several functions: supplying the reactants to the MEAs; removing products; providing electrical connections; and providing physical support.

High electrochemical potentials can occur in a number of real-life operational situations and in certain circumstances can cause damage to the catalyst layer/electrode structure, primarily due to corrosion of any carbon present in the layer, such as the support material for the catalyst. Such situations are well documented but include:

(i) Cell reversal: fuel cells occasionally are subjected to a voltage reversal (cell is forced to the opposite polarity). In addition to the loss of power associated with one or more cells going into voltage reversal, undesirable electrochemical reactions may occur which detrimentally affect fuel cell components.

(ii) Start-up shut-down: for many fuel cells it is not practical or economic to provide purging of hydrogen from the anode gas space with an inert gas such as nitrogen during shut down. This means there may arise a mixed composition of hydrogen and air on the anode whilst air is present on the cathode. Similarly, when a cell is re-started after being idle for some time, air may have displaced hydrogen from the anode and as hydrogen is re-introduced to the anode, again a mixed air/hydrogen composition will exist whilst air is present at the cathode. Under these circumstances an internal cell can exist, which leads to high potentials on the cathode.

Solutions proposed to address the problems associated with incidences of high electrochemical potentials include employing a catalyst that is more resistant to oxidative corrosion than conventional catalysts and incorporating an additional catalyst composition for electrolysing water (water electrolysis thus occurs in preference to corrosion of any carbon support).

SUMMARY OF THE INVENTION

For fuel cells to become commercially viable, particularly for automotive use, it is necessary to provide a high performance and stable catalyst layer, but with a low platinum loading. Using an unsupported "Pt black" catalyst in the catalyst layer compared to a carbon supported platinum catalyst can provide a more durable catalyst layer by avoiding the problems associated with carbon corrosion that occurs as a result of the high potentials caused by incidences of cell reversal and start-up shut-down. However, the present inventors have found that to produce a Pt black catalyst layer with the required structure for satisfactory operation and with sufficient uniformity and continuity of coating of the catalyst layer on the substrate, the platinum loading required is much higher than the requirements for commercialisation of many fuel cell applications, and in particular for automotive applications. The present inventors have surprisingly found that incorporation of a highly electrically conductive and corrosion resistant carbonaceous material into the catalyst layer enables suitable catalyst layer structures to be produced, that are also of excellent uniformity and continuity and that have a platinum loading in the catalyst layer consistent with automotive requirements.

The present invention provides a catalyst layer. The catalyst layer comprises: (i) a platinum-containing electrocatalyst; (ii) an oxygen evolution reaction electrocatalyst; (iii) one or more carbonaceous materials selected from the group consisting of graphite, nanofibres, nanotubes, nanographene platelets and low surface area, heat-treated carbon blacks, wherein the one or more carbonaceous materials do not support the platinum-containing electrocatalyst; and (iv) proton-conducting polymer.

The invention also provides an electrode, either an anode or cathode, comprising a gas diffusion layer and the catalyst layer of the invention.

The invention also provides a catalyst-coated membrane comprising a proton-conductive membrane and the catalyst layer of the invention.

DETAILED DESCRIPTION OF THE INVENTION

Figure 1:
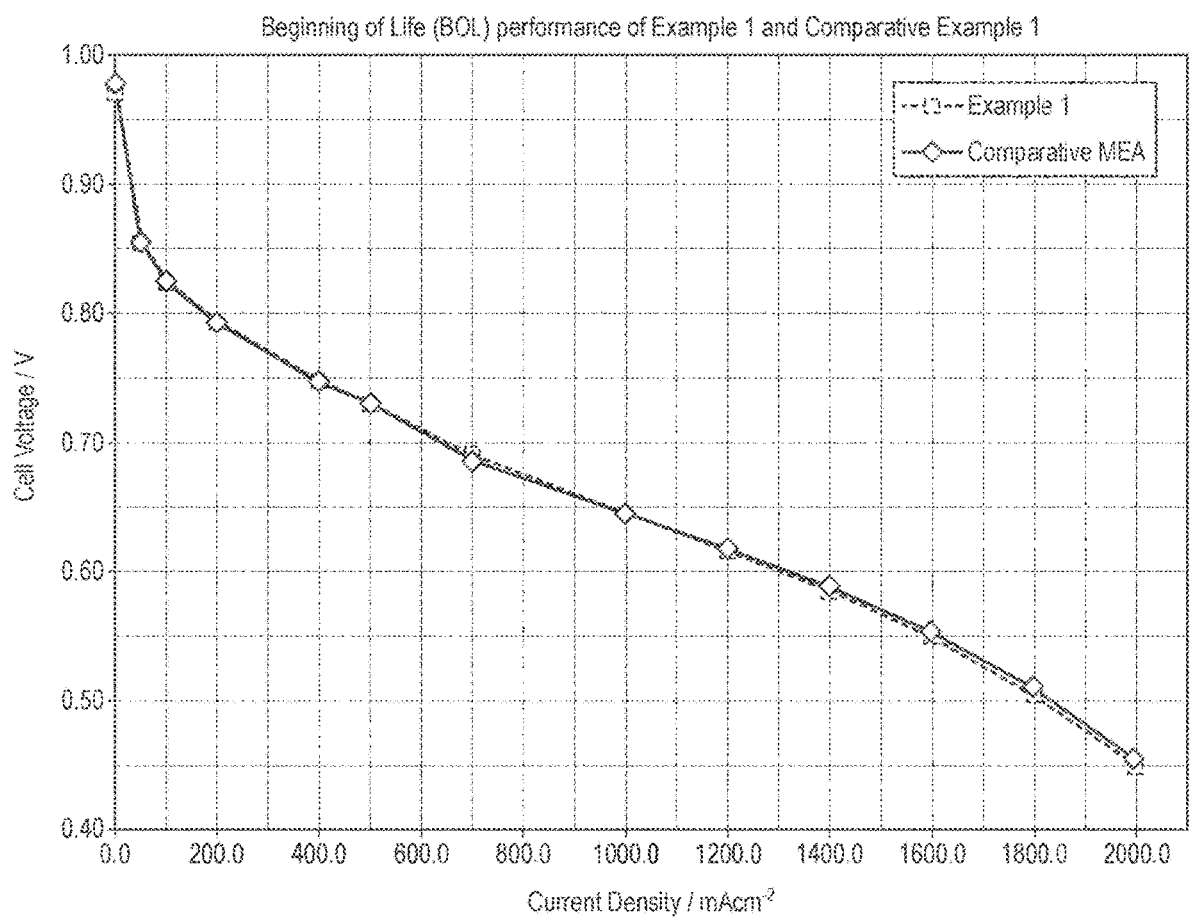
FIG. 1 shows the Beginning of Life (BOL) performance of Example 1 and Comparative Example 1.

Preferred and/or optional features of the invention will now be set out. Any aspect of the invention may be combined with any other aspect of the invention, unless the context demands otherwise. Any of the preferred or optional features of any aspect may be combined, singly or in combination, with any aspect of the invention, unless the context demands otherwise.

Electrocatalyst

The electrocatalyst comprises platinum.

The platinum may be alloyed or mixed with one or more other platinum group metals (ruthenium, rhodium, palladium, osmium or iridium), gold, silver or a base metal or an oxide of one or more other platinum group metals, gold, silver or a base metal.

The platinum may be alloyed or mixed with one or more of ruthenium, nickel, cobalt, chromium, iridium, copper, iron, zinc, osmium, niobium, tantalum, vanadium, tin, titanium and rhodium.

The electrocatalyst is unsupported i.e. it is present as the 'black'.

Alternatively, the electrocatalyst is supported on a non-carbonaceous support (such as titania, niobia, tantala, tungsten carbide, hafnium oxide or tungsten oxide).

Alternatively, the electrocatalyst is supported on the oxygen evolution reaction catalyst.

In one embodiment, the platinum-containing electrocatalyst is unsupported, supported on a non-carbonaceous support or supported on the oxygen evolution reaction catalyst.

The electrocatalyst may be made by methods known to those in the art, for example by wet chemical methods.

In one embodiment, the electrocatalyst is a hydrogen oxidation reaction catalyst. The hydrogen oxidation reaction catalyst is platinum which may be alloyed with one or more other metals, such as osmium, ruthenium, niobium, tantalum, vanadium, iridium, tin, titanium or rhodium.

In a second embodiment, the electrocatalyst is an oxygen reduction reaction catalyst. The oxygen reduction reaction catalyst is platinum which may be alloyed with one or more other metals, such as nickel, cobalt, chromium, palladium, iridium, copper, iron or zinc.

Oxygen Evolution Reaction Electrocatalyst

The oxygen evolution reaction (OER) catalyst is any catalyst known to those skilled in the art which catalyses the oxygen evolution reaction.

The oxygen evolution reaction catalyst suitably does not comprise platinum.

The oxygen evolution reaction catalyst may comprise ruthenium or ruthenium oxide or iridium or iridium oxide or mixtures thereof.

The oxygen evolution reaction catalyst may comprise iridium or iridium oxide and one or more metals M or an oxide thereof. M is a transition metal (other than iridium or ruthenium) or tin.

M may be a Group 4 metal: titanium, zirconium or hafnium.

M may be a Group 5 metal: vanadium, niobium or tantalum

M may be a Group 6 metal: chromium, molybdenum or tungsten.

M may be tin.

M may be selected from the group consisting of tantalum, titanium, zirconium, hafnium, niobium and tin; preferably tantalum, titanium and tin.

The iridium or oxide thereof and the one or more metals (M) or oxide thereof may either exist as mixed metals or oxides or as partly or wholly alloyed materials or as a combination thereof. The extent of any alloying can be shown by x-ray diffraction (XRD).

The atomic ratio of iridium to (total) metal M in the oxygen evolution catalyst is from 20:80 to 99:1, suitably 30:70 to 99:1 and preferably 60:40 to 99:1.

Such oxygen evolution catalysts may be made by methods known to those in the art, for example by wet chemical methods.

The oxygen evolution reaction catalyst may comprise a mixed metal oxide of formula

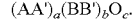

wherein A and A' are the same or different and are selected from the group consisting of yttrium, lanthanum, cerium, praseodymium, neodymium, promethium, samarium, europium, gadolinium, terbium, dysprosium, holmium, erbium, thulium, ytterbium, lutetium, magnesium, calcium, strontium, barium, sodium, potassium, indium, thallium, tin, lead, antimony and bismuth; B is selected from the group consisting of Ru, Ir, Os, and Rh; B' is selected from the group consisting of Ru, Ir, Os, Rh, Ca, Mg or RE (wherein RE is a rare earth metal); c is from 3-11; the atomic ratio of (a+b):c is from 1:1 to 1:2; the atomic ratio of a:b is from 1:1.5 to 1.5:1.

A and A' may be selected from the group consisting of: sodium, potassium, calcium, strontium, barium, lead and cerium.

B may selected from the group consisting of Ru, Ir, Os, Rh (suitably Ru and Ir) having an oxidation state of from $3^+$ to $6^+$, including intermediate partial oxidation states.

B' may be selected from the group consisting of Ru, Ir, Os, Rh (suitably Ru and Ir) having an oxidation state of from $3^+$ to $6^+$, including intermediate partial oxidation states, Ca, Mg, RE (wherein RE is as hereinafter defined), indium, thallium, tin, lead, antimony and bismuth.

c is from 3-11. Since the atomic ratio of (a+b):c is known, the value of (a+b) can be determined. Similarly, since the atomic ratio of a:b and the value of (a+b) is known, the values of a and b can be determined.

Specific examples of crystalline metal oxides which may be used as the oxygen evolution catalyst include, but are not limited to: $RERuO_3$; $SrRuO_3$; $PbRuO_3$; $REIrO_3$; $CaIrO_3$; $BaIrO_3$; $PbIrO_3$; $SrIrO_3$; $KIrO_3$; $SrM_{0.5}Ir_{0.5}O_3$; $Ba_3LiIr_2O_9$; $Sm_2NaIrO_6$; $La_{1.2}Sr_{2.7}IrO_{7.33}$; $Sr_3Ir_2O_7$; $Sr_2Ir_3O_9$; $SrIr_2O_6$; $Ba_2Ir_3O_9$; $BaIr_2O_6$; $La_3Ir_3O_{11}$; $RE_2Ru_2O_7$; $RE_2Ir_2O_7$; $Bi_2Ir_2O_7$; $Pb_2Ir_2O_7$; $Ca_2Ir_2O_7$; $(NaCa)_2Ir_2O_6$; $(NaSr)_3Ir_3O_{11}$; $(NaCe)_2Ir_2O_7$; $(NaCe)_2Ru_2O_7$; $(NaCe)_2(RuIr)_2O_7$.

In the above specific examples: RE is one or more rare earth metals selected from the group consisting of: yttrium, lanthanum, cerium, praseodymium, neodymium, promethium, samarium, europium, gadolinium, terbium, dysprosium, holmium, erbium, thulium, ytterbium, lutetium; M is Ca, Mg or RE (where RE is as defined before).

These crystalline mixed metal oxides may be prepared by methods known in the art, such as described in WO2012/080726.

The oxygen evolution catalyst may be unsupported.

Alternatively, the oxygen evolution catalyst may be supported on at least some of the one or more carbonaceous materials selected from the group consisting of graphite, nanofibres, nanotubes, nanographene platelets and low surface area, heat-treated carbon blacks, or on a non-carbonaceous support (such as titania, niobia, tantala, tungsten carbide, hafnium oxide or tungsten oxide).

Carbonaceous Material

The electrically conductive material may be graphite. Graphite is a crystalline allotropic form of carbon which has a layered, planar structure; in each layer, the carbon atoms are arranged in a hexagonal crystalline lattice. Graphite exists either in natural or synthetic form and is suitably used in its synthetic form.

The graphite may be particulate graphite, e.g. flake graphite, spherical graphite or graphite powder. The particle size of as-received graphite materials can vary over a wide range for different grades, typically from as low as 3 micron to as high as 500 micron diameter. The preferred graphite materials have a D50 (i.e. 50% of the particles are below a specific particle size) particle size range of from 3-4 micron up to around 20 micron, but are able to be broken down into smaller particles during processing to form the catalyst layer structures.

The graphite has a low specific surface area (as measured using the well-known BET method), for example a specific surface area less than 40 $m^2/g$, for example less than 20 $m^2/g$.

Examples of such graphite materials include products available from Timcal Graphite & Carbon under the tradenames TIMREX™ and C-NERGY™, from Branwell Graphite Ltd such as V-SGA5 and from Alfa Aesar, such as product 46304.

The carbonaceous material may be fibrous or tubular nanofibres or nanotubes, such as Pyrograf III® Carbon Fiber from Pyrograf Products Inc. or VGCF-H from Showa Denko K.K.

The carbonaceous material may be nanographene platelets, such as N008 or N006 from Angston Materials LLC.

The carbonaceous material may be a low surface area, heat-treated carbon black, for example graphitised Vulcan XC72R, which is available from Cabot Corporation. Low surface area, heat treated carbon blacks have an amorphous structure and are obtained by heat treating a commercially available carbon black in an inert atmosphere at a temperature of greater than 1500° C., suitably greater than 2000° C.

The carbonaceous materials used in the present invention have a surface area (as measured using the well-known BET method) of less than 100 $m^2/g$, suitably less than 80 $m^2/g$, suitably less than 40 $m^2/g$ and preferably less than 20 $m^2/g$.

Suitably, the one or more carbonaceous materials is selected from the group consisting of graphite, nanofibres, nanotubes and nanographene platelets; preferably, the one or more carbonaceous materials includes graphite, and most preferably, the carbonaceous material is graphite.

The one or more carbonaceous materials do not support the platinum-containing electrocatalyst. Suitably, the one or more carbonaceous materials do not support the oxygen evolution catalyst.

Proton-Conducting Polymer

The proton-conducting polymer is any polymer that is capable of conducting protons. Examples of such polymers include dispersions of polymers based on perfluorosulphonic acid (PFSA) polymers (such as those sold under the trade names Nafion® (E.I. DuPont de Nemours and Co.), Aquivion® (Solvay Speciality Polymers), Aciplex® (Asahi Kasei) and Flemion® (Asahi Glass KK). Such PFSA based ion-conducting polymers are formed from the copolymerisation of tetrafluoroethylene and a perfluorinated sulphonic acid derivative.

As an alternative to PFSA ion-conducting polymers it is possible to use dispersions of ion-conducting polymers based on sulfonated or phosphonated hydrocarbon polymers, such as the polyaromatic class of polymers.

Catalyst Layer

The catalyst layer may comprise additional components. Such components include, but are not limited to: a hydrophobic (a polymer such as PTFE or an inorganic solid with or without surface treatment) or a hydrophilic (a polymer or an inorganic solid, such as an oxide) additive to control water transport; an additional catalytic material for example having activity for the decomposition of hydrogen peroxide (e.g. ceria or manganese dioxide) or for improving the carbon monoxide tolerance of the catalyst layer (e.g. tantalum, niobium, rhodium). Any additional catalytic material may be supported or unsupported; if supported, it may be supported on at least some of the one or more carbonaceous materials selected from the group consisting of graphite, nanofibres, nanotubes, nanographene platelets and low surface area, heat-treated carbon blacks, or on a non-carbonaceous support (such as titania, niobia, tantala, tungsten carbide, hafnium oxide or tungsten oxide).

To prepare the catalyst layer the platinum-containing electrocatalyst, oxygen evolution reaction electrocatalyst, one or more carbonaceous materials and proton-conducting polymer, and any additional components, are dispersed in an aqueous and/or organic solvent, to prepare a catalyst ink. If required, particle break-up is carried out by methods know in the art, such as high shear mixing, milling, ball milling, passing through a microfluidiser etc or a combination thereof, to achieve uniformity of particle size.

After preparation of the catalyst ink, the ink is deposited onto a substrate (e.g. gas diffusion layer, proton exchange membrane or transfer substrate) to form the catalyst layer. The ink may be deposited by standard methods such as printing, spraying, knife over roll, powder coating, electrophoresis etc.

The catalyst layer is suitably ≥1 µm; more suitably ≥2 µm in thickness.

The catalyst layer is suitably ≤20 µm; more suitably ≤15 µm in thickness; preferably ≤10 µm in thickness.

The loading of platinum (from the platinum-containing electrocatalyst) in the catalyst layer is ≤0.8 $mg/cm^2$, suitably ≤0.4 $mg/cm^2$.

The loading of platinum (from the platinum-containing electrocatalyst) in the catalyst layer is ≤0.01 mg/cm$^2$, suitably ≤0.025 mg/cm$^2$.

The exact loading of platinum (from the platinum-containing electrocatalyst) in the catalyst layer is dependent upon whether the catalyst layer is for use at the anode or the cathode and determination of appropriate loadings will be known to those skilled in the art. For example, for use at the anode a platinum loading of 0.02-0.15 mg/cm$^2$ is appropriate. For use at the cathode, a higher platinum loading of 0.1-0.8 mg/cm$^2$ is appropriate Suitably, the ratio (by weight) of the oxygen evolution catalyst to total platinum-containing electrocatalyst (platinum+any alloying metal) in the catalyst layer is from 20:1 to 1:20, preferably from 1:1 to 1:10. The actual ratio will depend on whether the catalyst layer is employed at the anode or cathode and whether the oxygen evolution catalyst is used as a support for the electrocatalyst.

The ratio (by weight) of the platinum in the platinum-containing electrocatalyst to the one or more carbonaceous materials is from 5:95 to 95:5, suitably 10:90 to 90:10 and more suitably 40:60 to 90:10.

The catalyst layer of the invention has utility in an electrochemical device, and has particular utility in a membrane electrode assembly for a PEMFC.

The invention provides a gas diffusion electrode comprising a gas diffusion layer and a catalyst layer of the invention.

To prepare a gas diffusion electrode the catalyst ink is deposited directly onto a gas diffusion layer (GDL) for example by one of the methods previously described. Alternatively, the catalyst layer is first formed on a transfer substrate (such as a polymeric material such as polytetrafluoroethylene (PTFE) polyimide, polyvinylidene difluoride (PVDF), or polypropylene (for example biaxially-oriented polypropylene, BOPP) by deposition of a catalyst ink as hereinbefore described onto the transfer substrate. The catalyst layer may then be transferred to the GDL using a decal transfer technique known to those skilled in the art.

The GDLs are suitably based on conventional non-woven carbon fibre gas diffusion substrates such as rigid sheet carbon fibre papers (e.g. the TGP-H series of carbon fibre papers available from Toray Industries Inc., Japan) or roll-good carbon fibre papers (e.g. the H2315 based series available from Freudenberg FCCT KG, Germany; the Sigracet® series available from SGL Technologies GmbH, Germany; the AvCarb® series available from Ballard Material Products, United States of America; or the NOS series available from CeTech Co., Ltd. Taiwan), or on woven carbon fibre cloth substrates (e.g. the SCCG series of carbon cloths available from the SAATI Group, S.p.A., Italy; or the WOS series available from CeTech Co., Ltd, Taiwan). For many PEMFC applications the non-woven carbon fibre paper, or woven carbon fibre cloth substrates are typically modified with a hydrophobic polymer treatment and/or application of a microporous layer comprising particulate material either embedded within the substrate or coated onto the planar faces, or a combination of both, to form the gas diffusion layer. The particulate material is typically a mixture of carbon black and a polymer such as polytetrafluoroethylene (PTFE). Suitably the gas diffusion layers are between 100 and 300 μm thick. Preferably there is a layer of particulate material such as carbon black combined with PTFE on the faces of the gas diffusion layers that contact the electrocatalyst layers.

The invention also provides a catalyst coated membrane (CCM) comprising a proton exchange membrane (having a first and second face) and a catalyst layer of the invention.

The catalyst layer of the invention may be on the first face or the first and second faces of the proton exchange membrane. The catalyst layer components are formulated into an ink as hereinbefore described and the ink deposited onto the first or first and second faces of the proton exchange membrane using techniques such as spraying, printing and doctor blade methods. Alternatively, the catalyst layer is first formed on a transfer substrate (as hereinbefore described) and transferred onto the proton exchange membrane using a decal transfer technique known to those skilled in the art.

The proton exchange membrane may be any membrane suitable for use in a PEMFC, for example the membrane may be based on a perfluorinated sulphonic acid material such as Nafion® (DuPont), Aquivion® (Solvay Specialty Polymers), Flemion® (Asahi Glass KK) and Aciplex® (Asahi Kasei). Alternatively, the membrane may be based on a sulphonated hydrocarbon membrane such as those available from FuMA-Tech GmbH as the Fumapem® P, E or K series of products, JSR Corporation, Toyobo Corporation, and others. Alternatively, the membrane may be based on polybenzimidazole doped with phosphoric acid which will operate in the range 120° C. to 180° C. Other components may be added to the membrane, for example to improve the durability, as will be known to those in the art.

The proton exchange membrane may be a composite membrane, wherein the membrane contains other materials that confer properties such as mechanical strength. For example, the membrane may contain a porous reinforcing material, such as an expanded PTFE material.

The proton exchange membrane may also comprise one or more components which assist the chemical durability of the membrane, for example a hydrogen peroxide decomposition catalyst, a radical scavenger etc.

The invention also provides a MEA comprising a catalyst layer, a gas diffusion electrode or a catalyst coated membrane of the invention and an electrochemical device, such as a fuel cell, comprising a MEA, catalyst layer, gas diffusion electrode or catalyst coated membrane of the invention.

Although the invention is described with reference to its use in a PEMFC, it can be understood that the catalyst layer of the invention will have application in other types of fuel cells where the high voltage situations as described can occur. In addition the catalyst layer of the invention may find application in other electrochemical devices, such as at the oxygen evolution/reduction electrode of a regenerative fuel cell or the oxygen evolution electrode of an electrolyser.

EXAMPLES

The invention will be described further with reference to the following examples, which is illustrative and not limiting of the invention.

Example 1

An anode catalyst ink was prepared by mixing an unsupported platinum black catalyst (Johnson Matthey, HiSPEC 1000) with an aqueous dispersion of a perfluorosulphonic acid ionomer of equivalent weight 790 (Solvay Plastics, D79-25BS Dispersion) at a level of 16 wt % ionomer relative to the weight of platinum. The aqueous solution had a total solids content of 45%. The platinum black powder was added to the diluted ionomer dispersion at 65° C. with stirring. This dispersion was mixed using a high shear mixer to ensure the components were evenly dispersed before processing through a bead mill, to reduce the particle size of the Pt catalyst. An oxygen evolution catalyst (Johnson Matthey, $IrO_2/TaO_2$ prepared as described in WO2011/021034) was added to the diluted ink to achieve a ratio by weight of 1.0:1.26 Pt:$IrO_2/TaO_2$. The catalyst was gently stirred into the ink to ensure even distribution. After processing the ink was diluted with neat propan-1-ol to 35% total solids (propanol concentration 30.9% total ink).

Synthetic graphite powder (Alfa Aesar, 46304), with an as-received average particle size of 7-11 micron, was dispersed in neat propan-1-ol. The graphite dispersion was mixed using a high shear mixer and added to the Pt black/ionomer dispersion to give a weight ratio Pt to graphite of 1:0.36. The amount of propan-1-ol added to the graphite was calculated to give a final ink solids content of 16%. The final ink was passed through a high pressure homogeniser several times to further break down the particles and to ensure a homogeneous composition. Characterisation of the ink via particle size analysis, measured in a 22% propan-1-ol/water solution revealed that the D50 of the particles (i.e. combined catalyst, graphite and ionomer particles) was 2.5 micron.

The anode catalyst layer was prepared by depositing the anode catalyst ink onto a PTFE decal-transfer substrate and drying to achieve a continuous anode catalyst layer with a Pt metal loading of 0.08 mgPtcm$^{-2}$ as measured by XRF, and thickness of 2-3 μm. The same process was used to produce a cathode catalyst layer decal at 0.4 mgPtcm$^{-2}$ from a cathode ink containing a supported 50% Pt/carbon catalyst and 80% ionomer with respect to the weight of the carbon. The anode and cathode catalyst layer decals were positioned either side of a perfluorosulphonic acid membrane and hot pressed to produce a CCM. Appropriate seals and GDLs were added to allow compatibility with the fuel cell single cell hardware and the resultant MEAs were evaluated for beginning of life (BOL) performance and cell reversal tolerance.

Comparative Example 1

A comparative MEA was prepared using the same methodology as described for Example 1. The anode electrocatalyst was a conventional carbon black supported platinum catalyst (Johnson Matthey, 60 wt % Pt/Ketjen EC300J carbon) and the ionomer dispersion was added to a level of 80 wt % ionomer relative to the weight of the carbon support. The anode layer formulation comprised the same ionomer type as Example 1, the same Pt loading, and the same OER catalyst, but does not comprise any graphite. The ratio of Pt to OER catalyst was 1.0:0.86 Pt:$IrO_2/TaO_2$. The other components of Comparative Example 1 i.e. the GDL, seals, PFSA membrane and the cathode catalyst layer were identical to those used in Example 1.

A summary of the Example 1 and Comparative Example 1 is given in Table 1.

TABLE 1

| | Example 1 | Comparative Example 1 |
|---|---|---|
| Electrocatalyst | Pt Black | 60 wt % Pt/ketjen EC300J |
| Oxygen evolution reaction catalyst | $IrO_2/TaO_2$ | $IrO_2/TaO_2$ |
| Carbonaceous material | Graphite | N/A |
| Proton-conducting polymer | PFSA EW 790 | PFSA EW 790 |
| Platinum loading | 0.08 mgPt/cm$^2$ | 0.08 mgPt/cm$^2$ |
| Catalyst layer thickness | 2-3 μm | 2-3 μm |
| Pt-containing electrocatalyst:OER catalyst | 1.0:1.26 | 1.0:0.86 |
| Pt:carbonaceous material | 1:0.36 | N/A |

Example 1 and the Comparative Example 1 were both tested in the same single cell hardware under the same test conditions. Following positioning between the bi-polar plates of the cell, the MEA was placed under compression, the cell was heated and reactant gases and humidification supplied. The MEAs were conditioned and a beginning of life MEA performance polarisation plot (voltage vs. current) was measured under a range of operating conditions, including a test with $H_2$/Air, at 1.5/2.0 stoichiometry, 65° C., 50% relative humidity and ambient pressure. The results for Example 1 and the Comparative Example 1 (Comparative MEA) are shown in FIG. 1. The MEAs show a very similar voltage and resistance response across the current density range demonstrating that the same BOL performance can be attained from the anode catalyst layer of the invention in comparison to the more conventional carbon supported Pt/carbon catalyst based anode layer.

Figure 2:
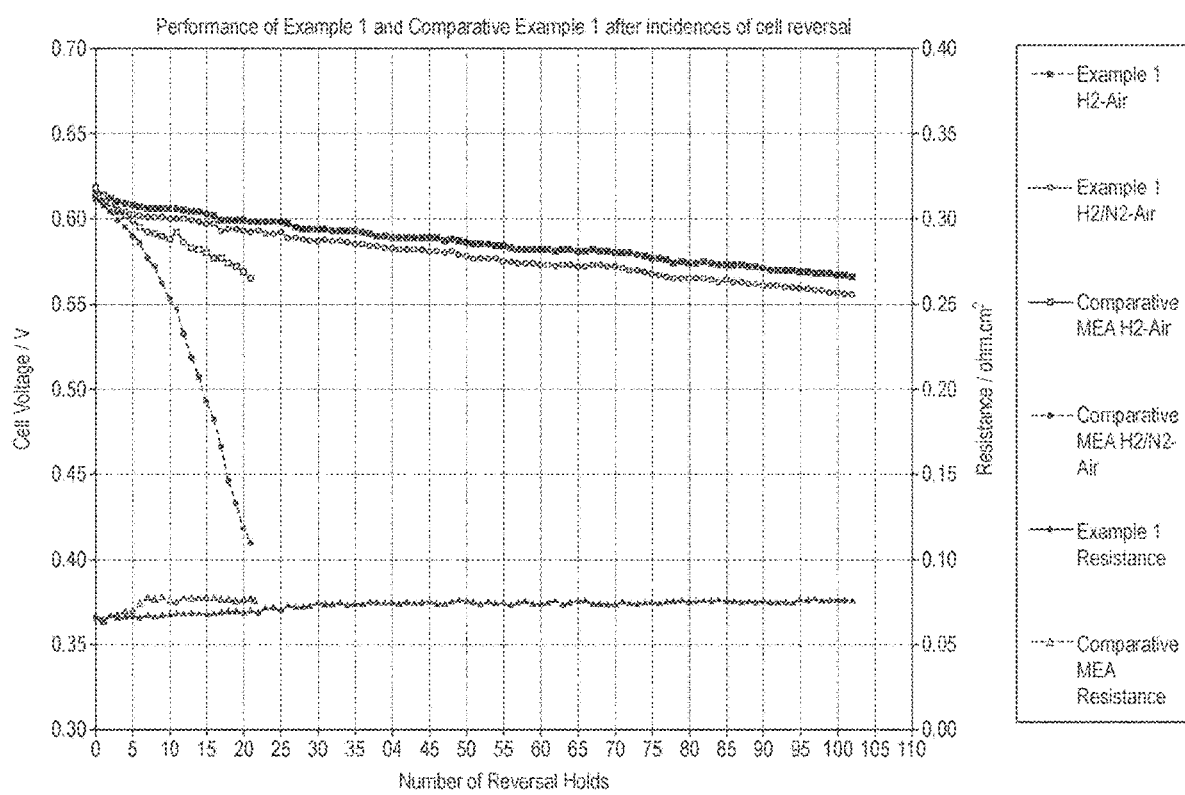
FIG. 2 shows the performance of Example 1 and Comparative Example 1 after incidences of cell reversal.

Following the BOL performance test the MEA performance stability during a highly accelerated anode reversal test was evaluated. The MEA was conditioned at 65° C., 50% RH and ambient pressure while supplied with $H_2$ and synthetic air (21% $O_2$/79% $N_2$) at 1.5/2.0 stoichiometry. The anode gas was then changed from $H_2$ to $N_2$. A load of 200 mAcm$^{-2}$ was then drawn from the cell to simulate a reversal event caused by gas starvation to the anode side. The cell voltage, resistance and $CO_2$ content of anode exhaust was monitored for the 5 minute duration of the reversal event, after which time $H_2$ was re-supplied to the anode, and air to the cathode. The cell was reconditioned and a performance and resistance measurement performed under the same conditions as at BOL to determine the impact of the reversal event. The procedure was repeated until a 50 mV loss at 1.2 Acm$^{-2}$ on $H_2$/air was observed. This point was denoted as the end-of-life (EOL) criteria. An anode diagnostic test was also performed at BOL and after each reversal event in which the performance was measured using a $H_2/N_2$ (75:25) anode gas composition to evaluate any changes to anode mass transport losses throughout the test. FIG. 2 compares the performance at 1.2 Acm$^{-2}$ after multiple reversal events for Example 1 and Comparative Example 1 (Comparative MEA) over the duration of the test. Superior retention of MEA performance is clearly observed for Example 1 vs. the Comparative Example 1 under both $H_2$/air and in the $H_2/N_2$/air diagnostic test. Comparative Example 1 reached the EOL criteria after only 21 reversal cycles, whilst Example 1 was clearly superior and was able to withstand 102 reversal cycles before reaching the EOL point. This benefit is ascribed to the improved layer formulation of Example 1 minimising anode layer degradation via carbon corrosion ($CO_2$). This effect is seen in both the $H_2/N_2$ anode diagnostic test in FIG. 2 and the measured $CO_2$ in the anode exhaust during the reversal events. For Example 1 the $CO_2$ content of the anode exhaust was always measured to below 100 ppm, whilst for the Comparative MEA $CO_2$ levels up to 470 ppm were measured in the anode exhaust.

The invention claimed is:
1. A catalyst layer comprising:
   (i) a platinum-containing electrocatalyst;
   (ii) an oxygen evolution reaction electrocatalyst;
   (iii) one or more carbonaceous materials selected from the group consisting of particulate graphite, nanofibres, nanotubes, and nanographene platelets; and
   (iv) a proton-conducting polymer;
   wherein the carbonaceous material is dispersed within the platinum-containing electrocatalyst;

wherein the platinum-containing electrocatalyst is unsupported, supported on a non-carbonaceous support or supported on the oxygen evolution reaction electrocatalyst;

wherein the layer does not include a platinum-containing electrocatalyst supported on a carbonaceous support;

wherein the catalyst layer has a thickness of less than or equal to 20 μm; and, wherein the ratio by weight of the platinum in the platinum-containing electrocatalyst to carbonaceous material is from 40:60 to 95:5.

2. The catalyst layer according to claim 1, wherein the platinum-containing electrocatalyst is unsupported.

3. The catalyst layer according to claim 1, wherein the one or more carbonaceous materials have a surface area of less than 100 m$^2$/g.

4. The catalyst layer according to claim 1, wherein the one or more carbonaceous materials includes graphite.

5. The catalyst layer according to claim 1, wherein the one or more carbonaceous materials do not support the oxygen evolution catalyst.

6. The catalyst layer according to claim 1, wherein the catalyst layer is ≥1 μm in thickness.

7. The catalyst layer according to claim 1, wherein the loading of platinum is ≤0.8 mg/cm$^2$.

8. The catalyst layer according to claim 1, wherein the loading of platinum is ≥0.01 mg/cm$^2$.

9. An electrode comprising a gas diffusion layer and the catalyst layer according to claim 1.

10. The electrode according to claim 9, wherein the electrode is an anode.

11. A catalyst-coated membrane comprising a proton-conductive membrane and the catalyst layer according to claim 1.

12. A membrane electrode assembly comprising the catalyst layer according to claim 1.

13. The catalyst layer according to claim 1, wherein the one or more carbonaceous materials are selected from nanofibers and nanotubes.

14. The catalyst layer according to claim 1, wherein the one or more carbonaceous materials are nanographene platelets.

15. A membrane electrode assembly comprising the electrode according to claim 9.

16. A membrane electrode assembly comprising the catalyst-coated membrane according to claim 11.

17. A membrane electrode assembly comprising the electrode according to claim 10.

* * * * *